July 21, 1942.  P. B. LEVITT  2,290,341
LATHE CHUCK MOUNTING
Filed Aug. 29, 1940  2 Sheets-Sheet 1

INVENTOR
PERCY B. LEVITT
BY
ATTORNEY

July 21, 1942.　　　P. B. LEVITT　　　2,290,341
LATHE CHUCK MOUNTING
Filed Aug. 29, 1940　　　2 Sheets-Sheet 2
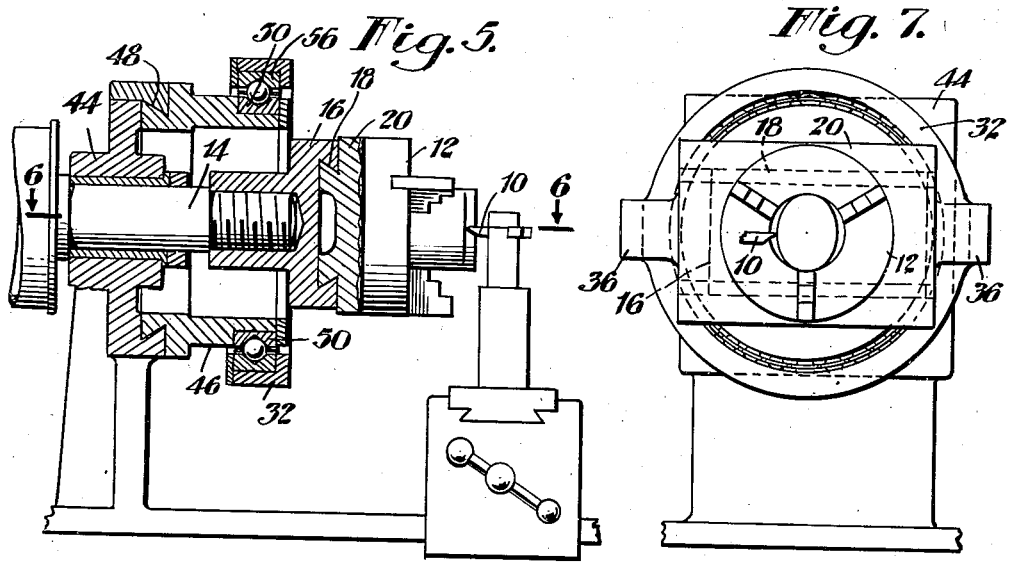
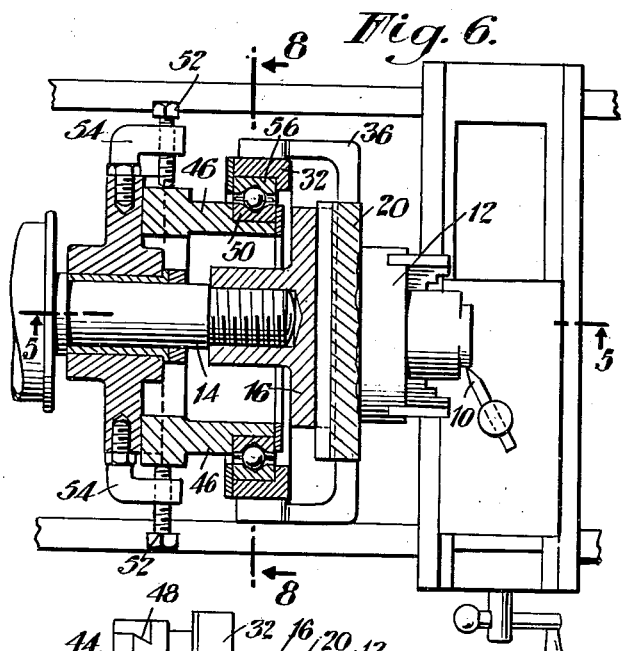
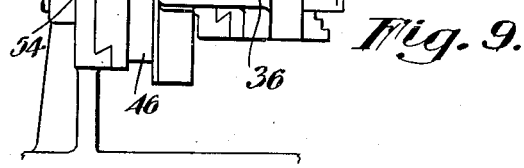
INVENTOR
PERCY B. LEVITT
BY
ATTORNEY Patented July 21, 1942

2,290,341

UNITED STATES PATENT OFFICE 2,290,341

LATHE CHUCK MOUNTING

Percy Bigmore Levitt, Millburn, N. J., assignor to Cities Service Oil Company, New York, N. Y., a corporation of Pennsylvania Application August 29, 1940, Serial No. 354,703

1 Claim. (Cl. 82—18)

This invention relates to an improvement in lathes designed to permit easy adaptation thereof to the cutting of shapes and bores of elliptical section.

A particular object of the invention is to provide an improved chuck mounting attachment for a lathe by means of which shapes and bores of elliptical section may be cut by a conventionally mounted cutting tool.

A more specific object is to provide a lathe chuck mounting attachment for cutting elliptical shapes or bores which is adjustable to vary the ratio between the major and minor axes of the ellipse.

With the foregoing and other objects and features in view, the invention consists in the improved lathe chuck attachment which is hereinafter described and more particularly defined by the accompanying claim.

In the following description of the invention reference will be made to the attached drawings, in which:

Fig. 5 is a vertical sectional view of a lathe chuck attachment designed in accordance with a preferred embodiment of the invention.

Fig. 6 is a cross section taken on the plane 6—6 of Fig. 5, looking down from above.

Fig. 7 is a view in end elevation showing the apparatus of Fig. 5.

Fig. 8 is a vertical section taken on the plane 8—8 of Fig. 6, looking in the direction of the arrow.

Fig. 9 is a side elevation of the apparatus at a reduced scale.

Figure 1:
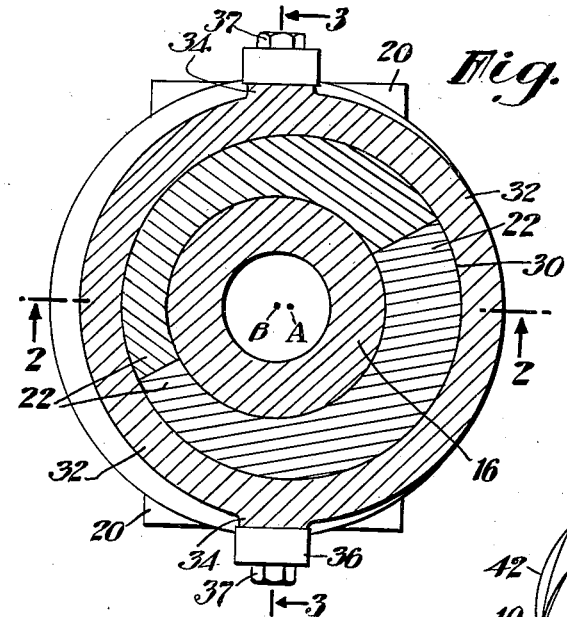
Fig. 1 is a transverse section of a lathe chuck attachment embodying the invention in a simplified form, taken on the plane 1—1 of Fig. 2.
Figure 2:
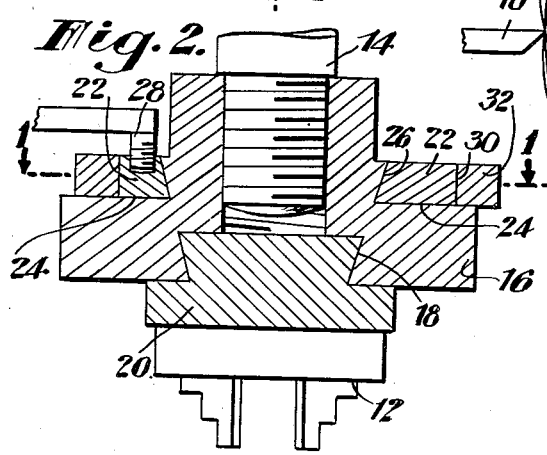
Fig. 2 is a longitudinal section taken along the line 2—2 of Fig. 1.
Figure 3:
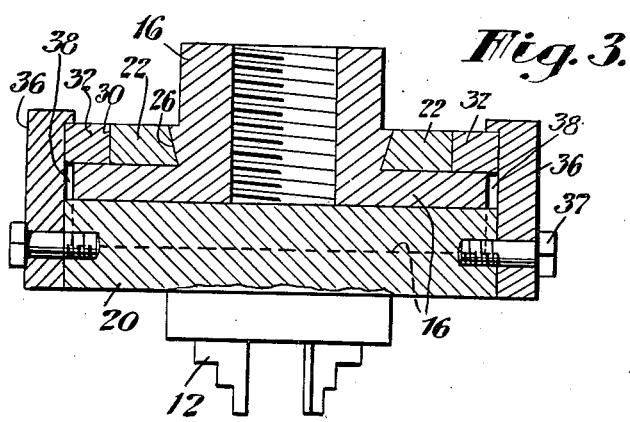
Fig. 3 is a vertical section along the line 3—3 of Fig. 1, looking in the direction of the arrows.

In Figs. 1, 2 and 3, a simple design of lathe chuck attachment is shown, in which the dimensions and locations of the various parts are fixed, so that an attachment assembled from such parts can only be used for cutting elliptical shapes and bores in which the major and minor axes of the ellipse have a definite ratio. In the drawings, the same or equivalent parts bear like numerical designations.

In the drawings 10 designates a lathe cutting tool having a conventional mounting; 12 designates a work holding chuck of conventional design; and 14 designates a threaded end of the conventional head stock spindle.

The present invention is particularly concerned with the parts or elements for operatively connecting chuck 12 to the end of spindle 14 for rotation thereby. For this purpose a circular adapter plate 16 is shown having a centrally bored hub, the bore of which is internally threaded to engage threads on the end of the spindle. Chuck 12 is removably mounted on and operatively connected to the front face of plate 16 by means of dovetail joint 18. The chuck is provided with an element 20 having an extension of its rear face shaped to form a tongue element of the joint 18 which engages a correspondingly shaped and dimensioned groove in the face of the plate. Element 20 is shown as generally rectangular in shape and as having a length somewhat greater than the diameter of plate 16.

In Figs. 1, 2 and 3 a split eccentric ring 22 has been shown as encircling the hub of plate 16 and as having its front face in abutting relation to the rear face of the plate 16 along a bearing surface 24. Eccentric 22 is shown as held in abutting relation to plate 16 by a circular V-groove bearing 26 between the hub of plate 16 and the inner edge of ring 22. While not illustrated, bearing 26 should preferably incorporate an adjusting element to prevent lost motion; as by inserting a take-up ring wedge held by a lock nut between the hub of plate 16 and the inner circumference of eccentric 22. During rotation of spindle 14, plate 16 and chuck 12, eccentric 22 is prevented from rotating by an anchor pin and arm 28 which is connected to a stationary part of the lathe, such as the bed plate. Eccentric 22 has a circular external periphery 30 which is dimensioned to match and register with the inner wall of a circular follower ring 32. Follower ring 32 has been shown as having ears or projections 34 on its external periphery at opposite sides of one diameter thereof. The dimension of the ring at this diameter, including the projections of the two ears beyond the ring circumference, substantially equals the length of element 20 of the chuck. Clamping straps 36 and bolts 37 are shown as connecting the chuck and the guide ring 32 into a unitary structure which rotates with spindle 14. In Fig. 1 the longitudinal axis A of eccentric 22 is shown as positioned on diameter 2—2, and the longitudinal axis of spindle 14 and plate 16 is at B. In Fig. 3 the sum of the two clearance spaces 38 between the outer circumference of plate 16 and the straps 36 should slightly exceed the eccentricity A—B of the ring 22 with respect to plate 16. In operation, adapter plate 16 rotates relative to stationary eccentric 22 over lubricated bearing surfaces 26 and 24. Likewise follower ring 32 rotates relative to the eccentric over the lubricated cylindrical bearing surface 30. Element 20 of the chuck rotates with plate 16, but also reciprocates relative thereto within the groove of the lubricated dovetail joint 18. This reciprocatory movement of the chuck is imparted thereto by the follower ring in rotating about the eccentric; the follower ring rotating with the adapter plate while at the same time reciprocating relative thereto over the lubricated bearing surface 24 thereof, in a path equal in length to the eccentricity A—B of the eccentric.

Figure 4:
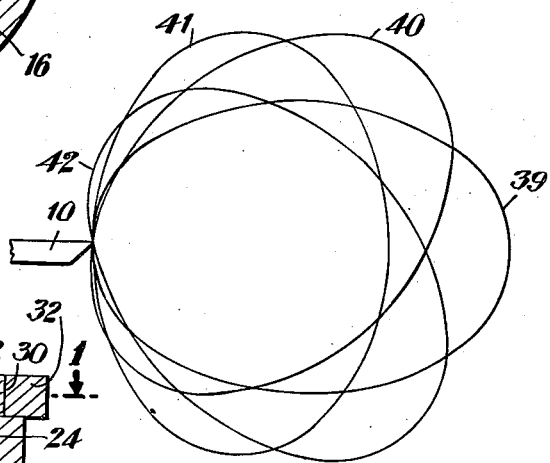
Fig. 4 illustrates diagrammatically how different portions of the periphery of a shape of elliptical section are successively presented to a stationary cutting tool during one half revolution of the chuck.

An article to which an elliptical shape is to be given, is centered in the grip of the chuck jaws, and cutting tool 10 is advanced to a stationary cutting position normal to the article surface and at the right side of the apparatus, as portrayed by Fig. 1. For cutting elliptical shapes, the cutting tool should always be placed on that side of the work which corresponds with the side of ring 22 of greatest eccentricity with respect to axis B of the spindle. For cutting elliptical bores the cutting tool should be located on that side of the object to be bored which is aligned with the side of minimum eccentricity. As the article being shaped is rotated in a counterclockwise direction, Fig. 4 illustrates diagrammatically the various positions assumed by a shaped end thereof during a half revolution of the chuck relative to a stationary cutting tool 10. Outline 39 in Fig. 4 shows the initial position; outline 40, the position after a 45° rotation; outline 41, the position after a 90° rotation; outline 42, the position after 135° rotation; and outline 39, the position after 180° rotation, with the ends of the ellipse reversed with respect to the initial position.

In the preferred design of chuck attachment which has been illustrated in Figs. 5, 6, 7, 8 and 9, roller bearings have been substituted for the plane bearing surfaces of the simplified design of Figs. 1, 2 and 3, and provision has been made to vary the eccentricity of the attachment by a simple adjustable eccentric guide ring mounting rather than by having to change eccentrics.

Referring to Figs. 5, 6, 7, 8 and 9, the threaded end of a head stock spindle 14 is shown as journaled by a head stock bearing 44, and as engaged by the threaded bore of the circular adapter plate 16. A chuck 12 of conventional design is provided with a carrier element 20 having a tongue extension of its rear face which is shaped and dimensioned to reciprocally engage a groove of corresponding shape and dimension in the front face of plate 16, thereby providing a dovetail joint 18. The eccentric element has been illustrated as including a cylindrical member 46 having its walls encircling spindle 14, and having a squared end which is tongued to fit in corresponding grooves in bearing 44, to form a dovetail joint 48. A circular ball bearing race 50 is mounted on the external periphery of the cylinder 46. As viewed in Fig. 5, the longitudinal axes of cylinder 46, ball race 50 and spindle 14 are all disposed in the same horizontal plane 6—6. However, as the apparatus is portrayed in Fig. 6 in a cross section taken on the plane 6—6 (see also Fig. 8), the longitudinal axes of member 46 and ball race 50 are shown to be in a position A which is eccentric to the major axis B of spindle 14 in the plane 6—6. In order to be able to vary the eccentricity of the ball race 50 with respect to the spindle 14, two adjusting bolts 52 are provided, each threadably mounted in brackets 54 which are positioned on opposite sides of bearing 44 in the plane 6—6 at right angles to the dovetail joint 48. By means of bolts 52 the tongue element at the squared end of cylinder 46 can be moved in the corresponding groove of the dovetail joint 48 to shift the axis A of the ball race 50 relative to the axis B of the spindle, in the plane 6—6. Brackets 54 have been shown as rotatably mounted in threaded apertures at the periphery of bearing 44, so that they may be readily removed or shifted to one side when it is desired to mount or dismount cylinder 46 in the dovetail joint 48.

Ball race 50 forms the eccentric guide unit of the apparatus shown in Figs. 5 to 9; and a follower ring 32 is provided which carries on its inner circumference a circular ball race 56 which is disposed in coaxial relation encircling ball race 50, to form a ball bearing having its axis of rotation at point A of Fig. 8. Follower ring 32 is attached to element 20 by extension straps or brackets 36 which are shown as extending outwardly and laterally from opposite ends of chuck element 20.

The operation of the apparatus of Figs. 5 to 9 should be readily apparent from the prior description. By means of bolts 52 the eccentricity of guide 46 and bearing race 50 can be varied so as to adjust the ratio between the major and minor axes of an elliptical shape or bore to that which it is desired to cut. After the eccentricity has been set, and after the article to be shaped has been centered and gripped in the jaws of the chuck, the cutting tool is brought into contact with the article on that side of axis B on which lies the eccentric axis A (Figs. 6, 7 and 8). As adapter plate 16 rotates about axis B of spindle 14, follower ring 32 simultaneously rotates on its ball bearing around the stationary eccentric 46. Thus at the same time that chuck 12 rotates with plate 16, it is also forced to reciprocate within the groove of the joint 18 in following the eccentric path of rotation of the follower 32.

The invention having been thus described in its preferred form, what is claimed as new is:

An elliptical motion lathe chuck attachment comprising an adapter plate arranged for coaxial mounting on a lathe spindle, a work holding chuck, a mounting joint between the chuck and plate arranged to allow the longitudinal axis of the chuck to reciprocate in a path normal to the axis of rotation of the plate, a stationary guiding element having a circular rolling bearing race with an axis located in a line eccentric to the spindle, a follower ring having a circular roller-bearing race disposed in registered bearing relation to the bearing race of the eccentric guide, and extension arms connecting the follower ring and chuck into a unitary structure arranged to continuously reciprocate the chuck with respect to the adapter plate while simultaneously rotating the chuck as a unit with the plate.

PERCY BIGMORE LEVITT.